United States Patent
Kao

(10) Patent No.: US 10,293,402 B2
(45) Date of Patent: *May 21, 2019

(54) GOOSENECK OPERATION DEVICE OF FULL-SERVO MULTI-AXIS DIE-CASTING MACHINE

(71) Applicant: T-SOK CO., LTD., New Taipei (TW)

(72) Inventor: Kun-Szu Kao, New Taipei (TW)

(73) Assignee: T-SOK CO., LTD., New Taipei (TW)

( * ) Notice: Subject to any disclaimer, the term of this patent is extended or adjusted under 35 U.S.C. 154(b) by 123 days.

This patent is subject to a terminal disclaimer.

(21) Appl. No.: 15/475,150

(22) Filed: Mar. 31, 2017

(65) Prior Publication Data

US 2018/0281057 A1    Oct. 4, 2018

(51) Int. Cl.
*B22D 17/20* (2006.01)
*B22D 17/32* (2006.01)
*H02K 7/116* (2006.01)

(52) U.S. Cl.
CPC ......... *B22D 17/2015* (2013.01); *B22D 17/32* (2013.01); *H02K 7/116* (2013.01)

(58) Field of Classification Search
CPC ........ B22D 17/00; B22D 17/20; B22D 17/26; B22D 17/30; B22D 17/32; B22D 17/2015; B22D 17/2061

USPC ......................... 164/303, 312, 316, 341, 342
See application file for complete search history.

(56) References Cited

U.S. PATENT DOCUMENTS

2015/0290705 A1 * 10/2015 Nakatsuka ......... B22D 17/2015
164/312

* cited by examiner

*Primary Examiner* — Kevin P Kerns
(74) *Attorney, Agent, or Firm* — Leong C. Lei

(57) ABSTRACT

A gooseneck operation device of a full-servo multi-axis die-casting machine includes a gooseneck operation device body, which includes a servomotor, a first transmission arm, a second transmission arm, and an injection unit. The servomotor includes a speed reduction mechanism, which is mounted, in an eccentric manner, in a spindle hole formed in the first transmission arm. The second transmission arm includes a rotatable joint section rotatably mounted to an opposite end of the first transmission arm and a transmission section that is provided with two bifurcation sections. The injection unit includes projection sections coupled to the bifurcation sections such that the operation of the servomotor causes the first and second transmission arms to drive the transmission section to rotate and make the bifurcation sections to oscillate frontwards and rearwards with the rotation of the transmission section so as to drive the injection unit to operate.

4 Claims, 4 Drawing Sheets

GOOSENECK OPERATION DEVICE OF FULL-SERVO MULTI-AXIS DIE-CASTING MACHINE

(a) TECHNICAL FIELD OF THE INVENTION

The present invention relates generally to an oscillation device, and more particularly to a gooseneck operation device for use in a die-casting machine by using a servomotor as a power source to cause the gooseneck operation device to oscillate frontwards and rearwards.

(b) DESCRIPTION OF THE PRIOR ART

Die casting is a process of casting that is achieved by filling metals having good property of melting and solidifying, such as aluminum, zinc, magnesium, and copper, through fast high pressure mechanical property, into a temperature-resistant metal mold and making use of a relatively low temperature of the steel mold to achieve fast cooling and solidification for shape fixing.

A regular hot-chamber die-casting machine generally comprises a base on which a mold is provided. The mold is provided, at one side thereof, with an injection port. A melting furnace is provided beside the base and a hydraulic cylinder is arranged above the melting furnace. The hydraulic cylinder is provided, on an end thereof, with an injection head that mates and is connectable with the injection port of the mold in order to allow fast high pressure mechanical property to be filled into the temperature-resistant metal mold. The conventional die-casting machine suffers certain drawbacks. For example, a pneumatic cylinder or a hydraulic cylinder is used as a power source and a moving stroke or speed cannot be controlled accurately. Calibration and tuning must be conducted based on experience. Further, the hydraulic cylinder often makes the working environment oily. Improvements are necessary for the conventional die-casting machine.

Thus, the technical issue that the present invention is made for is to overcome the above-discussed shortcomings.

SUMMARY OF THE INVENTION

In view of the above-discussed shortcomings, the present invention provides a gooseneck operation device of a full-servo multi-axis die-casting machine, which comprises: a gooseneck operation device body, which comprises a servomotor, a first transmission arm, a second transmission arm, and an injection unit. The servomotor comprises a speed reduction mechanism. The first transmission arm has an end that comprises a spindle hole formed therein. The speed reduction mechanism is mounted, in an eccentric manner, to the spindle hole. The second transmission arm comprises a rotatable joint section and a transmission section. The rotatable joint section and the transmission section form therebetween a predetermined included angle. The rotatable joint section is rotatably mounted to an opposite end of the first transmission arm. The transmission section is provided with at least two bifurcation sections. The injection unit is provided with an inlet port and an outlet port respectively formed in a bottom surface and a front end thereof. A projection section projects sideways from each of two opposite sides of the outlet port and the bifurcation sections are respectively coupled to the projection sections. As such, when the servomotor is in operation, the first transmission arm and the second transmission arm are driven to cause the transmission section to rotate such that the bifurcation sections are driven to oscillate frontwards and rearwards with the rotation of the transmission section thereby driving the injection unit to operate.

The purpose of the gooseneck operation device of the full-servo multi-axis die-casting machine according to the present invention is to replace a pneumatic cylinder or a hydraulic cylinder with a servomotor so that operation strokes are made more accurate without noise generated by a pneumatic cylinder and oiliness caused by a hydraulic cylinder.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings, identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
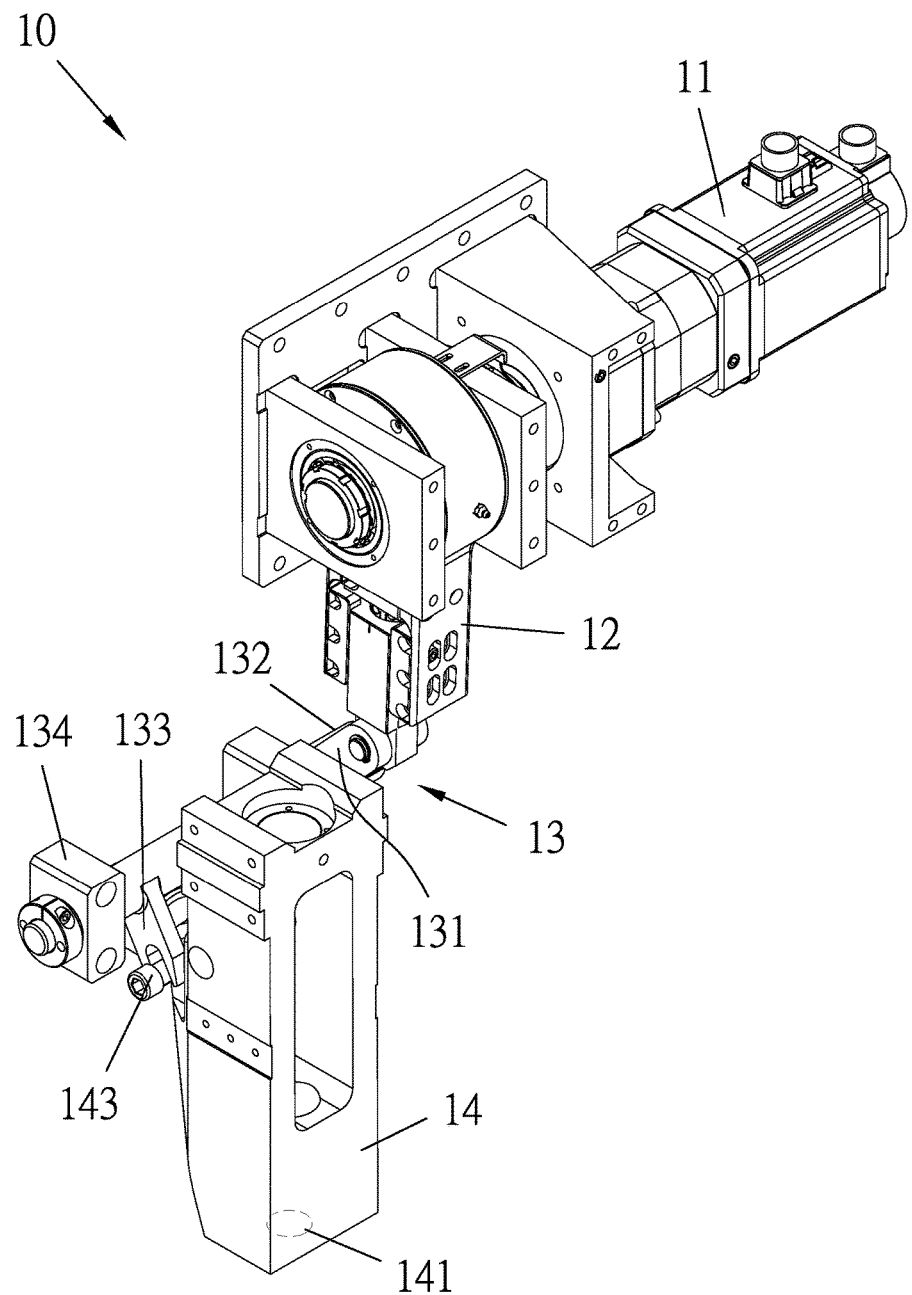
FIG. 1 is a perspective view of the present invention.
Figure 2:
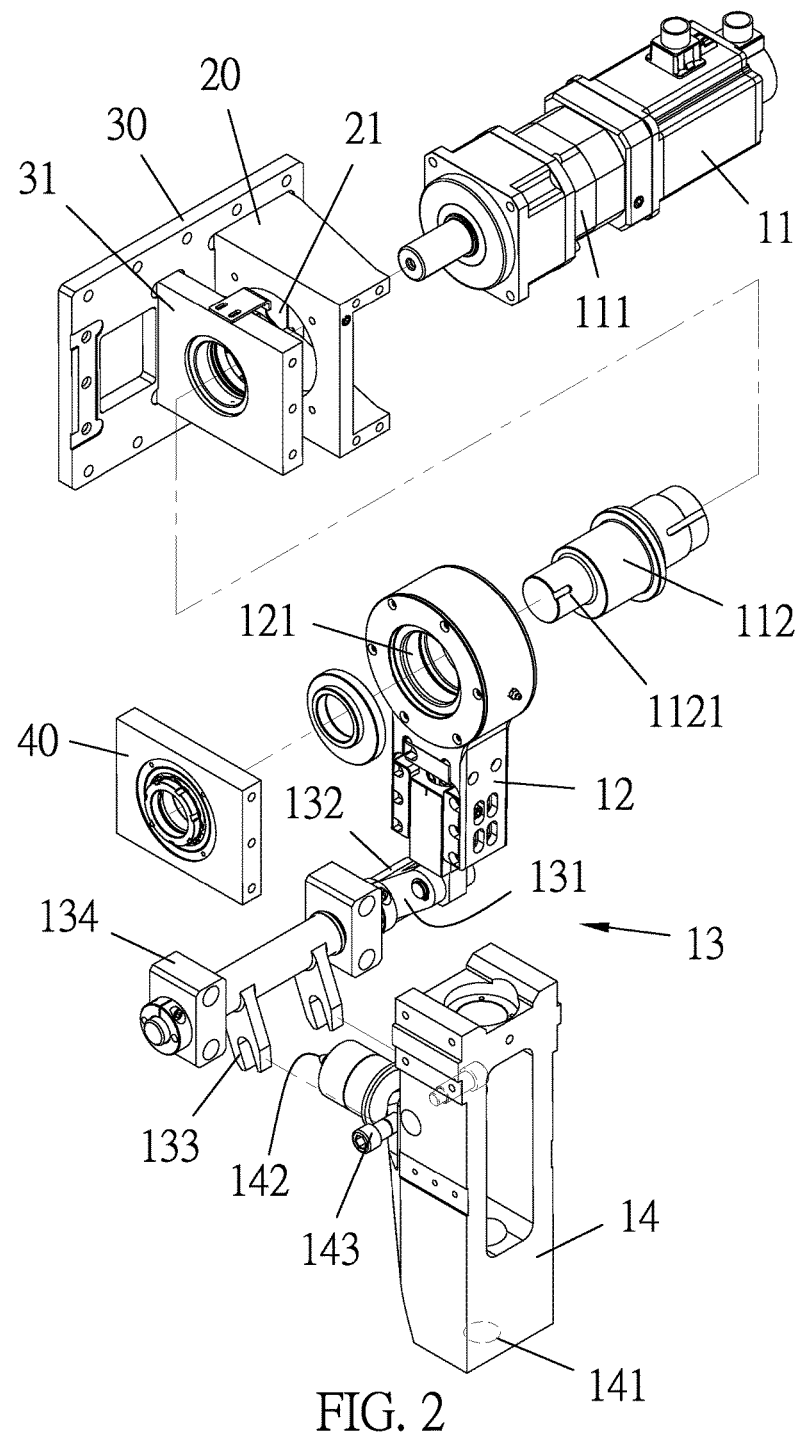
FIG. 2 is an exploded view of the present invention.

Firstly, referring to FIGS. 1 and 2, the present invention provides a gooseneck operation device of a full-servo multi-axis die-casting machine, which comprises: a gooseneck operation device body 10.

The gooseneck operation device body 10 comprises a servomotor 11, a first transmission arm 12, a second transmission arm 13, and an injection unit 14. The servomotor 11 comprises a speed reduction mechanism 111. The first transmission arm 12 has an end that comprises a spindle hole 121 formed therein. The speed reduction mechanism 111 is mounted, in an eccentric manner, to the spindle hole 121. The second transmission arm 13 comprises a rotatable joint section 131 and a transmission section 132. The rotatable joint section 131 and the transmission section 132 form therebetween a predetermined included angle. The rotatable joint section 131 is rotatably mounted to an opposite end of the first transmission arm 12. The transmission section 132 is provided with at least two bifurcation sections 133. The injection unit 14 is provided with an inlet port 141 and an outlet port 142 respectively formed in a bottom surface and a front end thereof. A projection section 143 projects sideways from each of two opposite sides of the outlet port 142 and the bifurcation sections 133 are respectively coupled to the projection sections 143.

The predetermined included angle that was mentioned above is 90 degrees; and an end of the servomotor 11 to which the speed reduction mechanism 111 is mounted is coupled to a frame 20. The frame 20 is provided, at one side thereof, with a seat plate 30. The frame 20 is formed with a through aperture 21 and the seat plate 30 is provided with a first spindle seat 31, such that the through aperture 21 and the first spindle seat 31 receive the speed reduction mechanism 111 to extend therethrough. The speed reduction mechanism 111 is coupled to an eccentric element 112. An end of the eccentric element 112 that is coupled to the speed reduction mechanism 111 is rotatably mounted to the first spindle seat 31 and an opposite end of the eccentric element 112 is received through the spindle hole 121. The eccentric element 112 is provided, on an end face of said opposite end, with an eccentric shaft 1121 extending therefrom. The eccentric shaft 1121 is rotatably mounted to a second spindle seat 40.

The transmission section 132 is further provided thereon with two spaced coupling elements 134. The bifurcation sections 133 are located between the coupling elements 134 such that a predetermined distance is present between the bifurcation sections 133.

Figure 3:
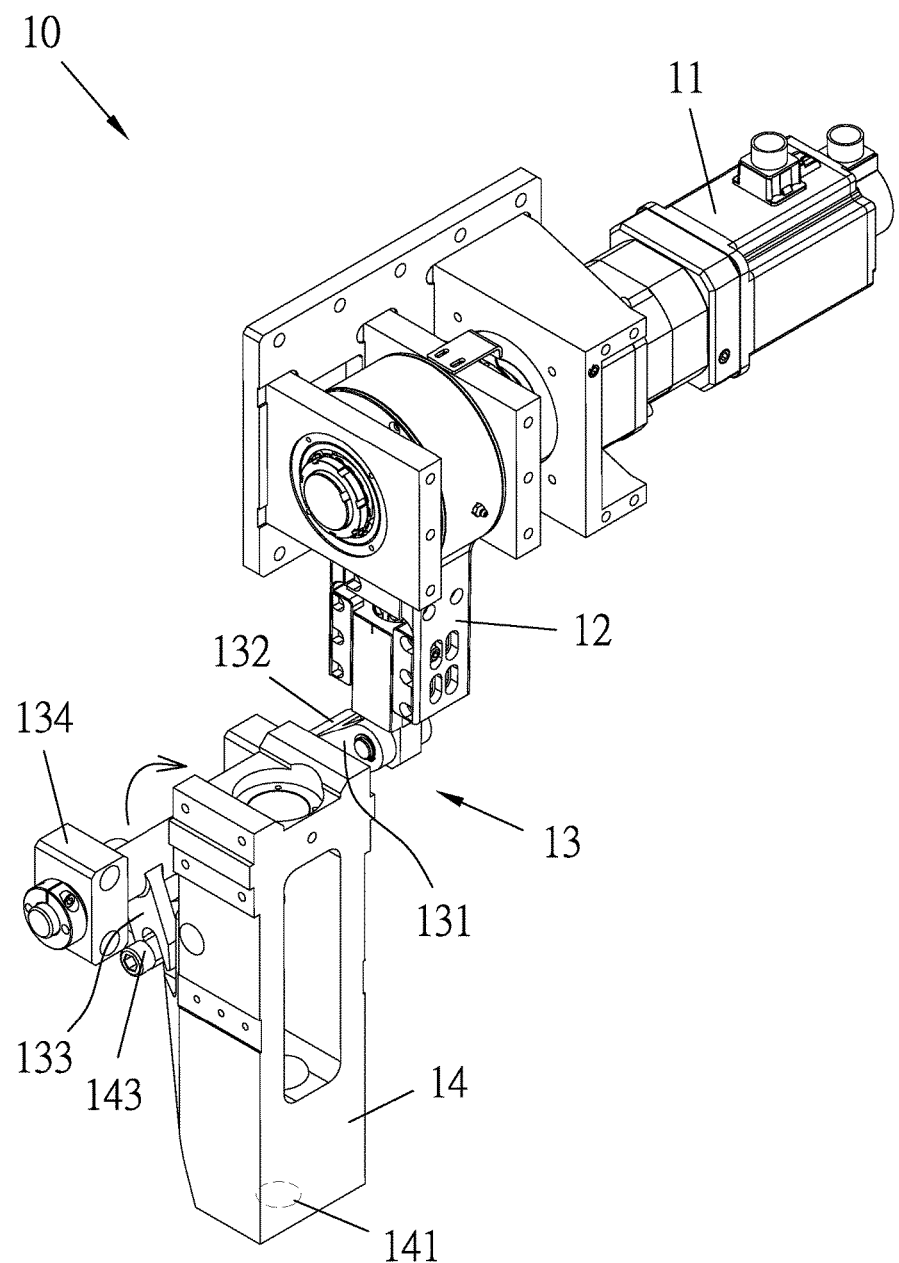
FIG. 3 is a perspective view demonstrating operation of the present invention.
Figure 4:
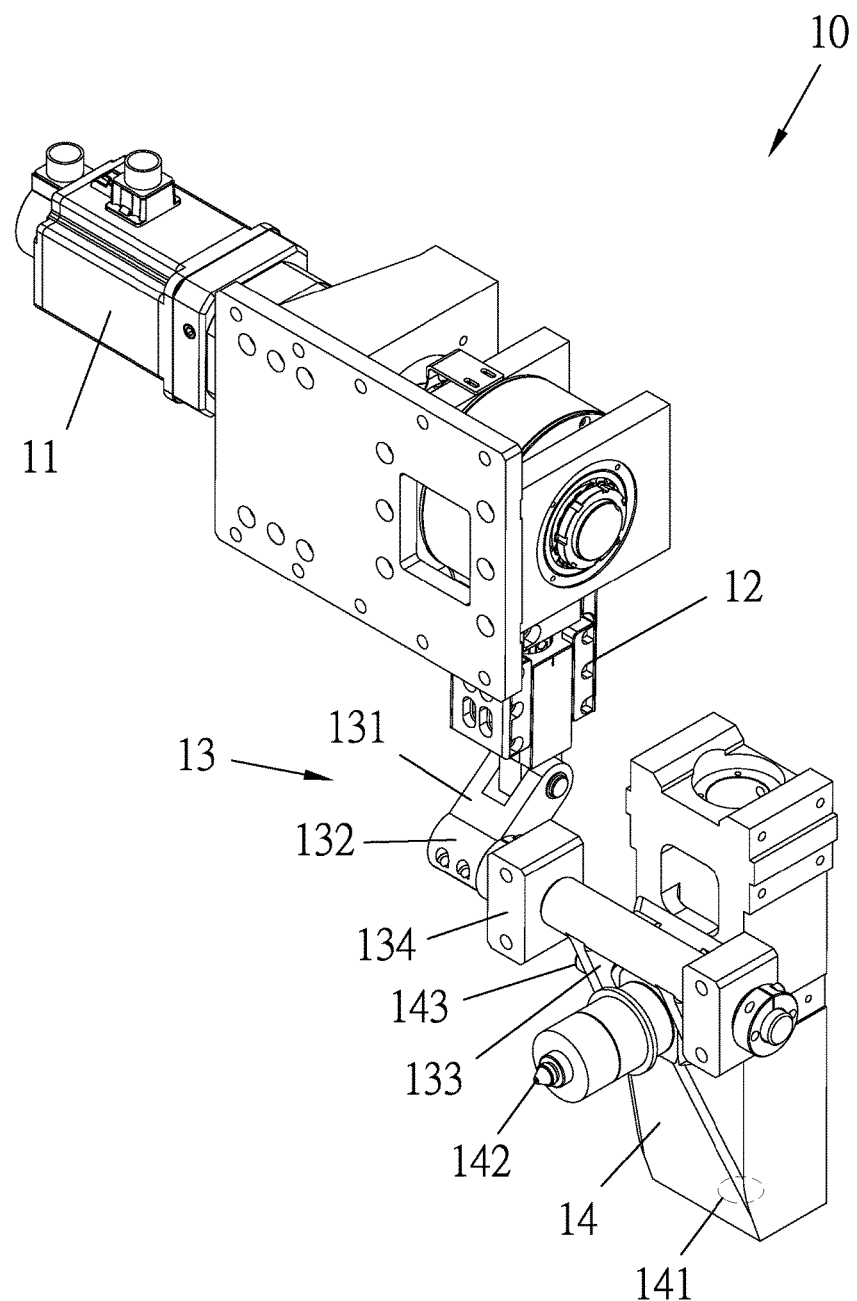
FIG. 4 is a perspective view, similar to FIG. 3, but taken from a different view angle.

Referring to FIGS. 1, 3, and 4, when the servomotor 11 is in operation, the first transmission arm 12 and the second transmission arm 13 are driven to cause the transmission section 132 to rotate such that the bifurcation sections 133 are driven to oscillate frontwards and rearwards with the rotation of the transmission section 132 thereby driving the injection unit 14 to operate.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the claims of the present invention.

I claim:

1. A gooseneck operation device of a full-servo multi-axis die-casting machine, comprising:
a gooseneck operation device body, which comprises a servomotor, a first transmission arm, a second transmission arm, and an injection unit, wherein the servomotor comprises a speed reduction mechanism; the first transmission arm has an end that comprises a spindle hole formed therein; the speed reduction mechanism is mounted, in an eccentric manner, to the spindle hole; the second transmission arm comprises a rotatable joint section and a transmission section; the rotatable joint section and the transmission section form therebetween a predetermined included angle; the rotatable joint section is rotatably mounted to an opposite end of the first transmission arm; the transmission section is provided with at least two bifurcation sections; the injection unit is provided with an inlet port and an outlet port respectively formed in a bottom surface and a front end thereof; and a projection section projects sideways from each of two opposite sides of the outlet port and the at least two bifurcation sections are respectively coupled to the projection sections, whereby when the servomotor is in operation, the first transmission arm and the second transmission arm are driven to cause the transmission section to rotate such that the at least two bifurcation sections are driven to oscillate frontwards and rearwards with rotation of the transmission section thereby driving the injection unit to operate.

2. The gooseneck operation device of the full-servo multi-axis die-casting machine according to claim 1, wherein the predetermined included angle is 90 degrees.

3. The gooseneck operation device of the full-servo multi-axis die-casting machine according to claim 1, wherein an end of the servomotor to which the speed reduction mechanism is mounted is coupled to a frame; the frame is provided, at one side thereof, with a seat plate; the frame is formed with a through aperture and the seat plate is provided with a first spindle seat, such that the through aperture and the first spindle seat receive the speed reduction mechanism to extend therethrough; the speed reduction mechanism is coupled to an eccentric element; an end of the eccentric element that is coupled to the speed reduction mechanism is rotatably mounted to the first spindle seat and an opposite end of the eccentric element is received through the spindle hole; the eccentric element is provided, on an end face of said opposite end, with an eccentric shaft extending therefrom; and the eccentric shaft is rotatably mounted to a second spindle seat.

4. The gooseneck operation device of the full-servo multi-axis die-casting machine according to claim 1, wherein the transmission section is further provided thereon with two spaced coupling elements and the at least two bifurcation sections are located between the coupling elements such that a predetermined distance is present between the at least two bifurcation sections.

* * * * *